United States Patent [19]

Nelson-Ashley et al.

[11] Patent Number: 4,935,079
[45] Date of Patent: Jun. 19, 1990

[54] METHODS OF MAKING POLYETHYLENE/METAL LAMINATES

[75] Inventors: Dominic I. Nelson-Ashley; Graham M. Gossedge, both of Oxfordshire, Great Britain

[73] Assignee: CMB Packaging (UK) Limited, Great Britain

[21] Appl. No.: 197,432

[22] Filed: May 19, 1988

Related U.S. Application Data

[63] Continuation-in-part of Ser. No. 355,598, Feb. 19, 1982, abandoned.

[30] Foreign Application Priority Data

Jun. 26, 1980 [GB] United Kingdom ............... 8020893

[51] Int. Cl.⁵ .................. B32B 31/20; B32B 31/28
[52] U.S. Cl. ........................ 156/82; 156/221; 156/224; 156/272.6; 156/273.3; 156/308.6; 156/309.9; 156/322
[58] Field of Search ................. 428/461, 523; 156/309.9, 497, 244.27, 82, 153, 196, 199, 212, 221, 224, 244.23, 244.24, 244.26, 272.6, 273.3, 273.5, 274.4, 274.6, 274.8, 308.6, 309.6, 322, 324

[56] References Cited

U.S. PATENT DOCUMENTS

| | | | |
|---|---|---|---|
| 2,795,263 | 6/1957 | Honkanen | 156/497 |
| 3,981,849 | 9/1976 | Frese | 526/348.6 |
| 4,125,670 | 11/1978 | Perfetti | 428/461 |
| 4,313,996 | 2/1982 | Newman | 156/244.27 |

FOREIGN PATENT DOCUMENTS

1295132 11/1972 United Kingdom .

Primary Examiner—Merrell C. Cashion, Jr.
Attorney, Agent, or Firm—Burns, Doane, Swecker & Mathis

[57] ABSTRACT

A method of making a laminated structure in which a polyethylene element is bonded directly to a metal substrate by the application of heat and pressure is characterised by the selection of the polyethylene, for the purpose of obtaining good adhesion, to be a linear low density polyethylene having a density from 0.91 to 0.94 g/ml$^{-1}$ and a melt flow index in the range 0.2 to 2.0 g/10 min, produced by low pressure co-polymerisation of ethylene and but-1-ene. The polyethylene may be pre-treated, e.g. by corona discharge, glow discharge or flame treatment to further improve the adhesion. The polyethylene element may be a film applied to one or both sides of the metal substrate which may be a sheet or foil.

22 Claims, 2 Drawing Sheets

METHODS OF MAKING POLYETHYLENE/METAL LAMINATES

CROSS REFERENCE TO RELATED APPLICATION

This is a continuation-in-part of parent application Ser. No. 06/355,598, filed February 19, 1982, now abandoned.

BACKGROUND AND SUMMARY OF THE INVENTION

This invention relates to structures comprising an element of polyethylene bonded to a surface of a metal substrate and to methods of making such structures. More particularly, but not exclusively, the invention relates to structures in the form of a laminate of polyethylene film and metal in the form of sheet or foil which may be formed into an article.

British Patent Specification No. 1,295,132 describes a method of forming a laminate of polyethylene and various metal substrates. In one example given, a low density polyethylene film was pretreated by corona discharge and then applied to preheated tinplate by means of a rubber coated roller. The laminate was allowed to cool whereon the peel strength of the bond between the pretreated polyethylene and the tinplate was 33 lb. per linear inch (150N/linear inch). When the method was repeated using an untreated polyethylene the coating could readily be stripped off the tinplate.

Unexpectedly we have found that a particular range of the now available polyethylenes called "linear low density polyethylenes" can be bonded directly to various metal substrates by the influence of heat and pressure. The term "linear low density polyethylene" is becoming widely used in the plastics industry. (See for example "Modern Plastics International" March 1980 p. 35; European Plastics News" March 1980 p. 8; and "Modern Plastics International" 1979 p. 26, p. 76).

In this specification the term "linear low density polyethylene" is used to denote a group of co-polymeric materials of low to medium density, produced by low pressure co-polymerisation of ethylene and an alpha olefin co-monomer, using an appropriate catalyst.

The molecular arrangement is believed to consist of a regular linear main-chain backbone with a number of short side chains. Where the co-monomer is but-1-ene, the side chains are formed by ethyl groups. The polymers show different behaviour from conventional low density polyethylenes made by the high pressure process, in particular by having a higher melt temperature.

The invention provides a method of making a laminated structure including an element of polyethylene bonded to a surface of the metal substrate by engaging the polyethylene element with the surface of the metal substrate and bonding it directly thereto by the application of heat and pressure, characterised by the step of selecting the polyethylene to be a linear low density polyethylene having a density from 0.91 to 0.94 g.ml$^{-1}$ and a melt flow index in the range 0.2 to 2.0 g/10 min, produced by low pressure co-polymerisation of ethylene and but-1-ene.

The metal substrate may be chosen from various metals such as steel; steel having a coating of tin or chromium or chromium/chromium oxide or zinc; aluminium; aluminium alloy; nickel; zinc or copper. The metal substrate may, if desired, have a conversion coating thereon such as the passivation coating on tinplate or oxide on aluminium.

Preferably the polyethylene element is the form of a film and the metal substrate is in the form of a sheet or foil. If desired the polyethylene film may be engaged with one side of the sheet metal or to opposed sides of the sheet metal to make a laminate of polyethylene/metal/polyethylene. Conversely sheet metal may be engaged with opposed surfaces of the polyethylene film to make a laminate of metal/polyethylene/metal. If desired the polyethylene may contain fillers or pigments such as titanium dioxide.

In a first embodiment of the method the polyethylene and metal substrate are heated together to a temperature within the range 200° C. to 300° C.; sufficient pressure is applied to exclude any risk of bubbles between the polyethylene and substrate. The pressure is preferably less than 3500 kPa, a particularly preferred range of pressure being between 200 kPa and 2400 kPa. The pressure is preferably applied for a period in the range 0.1 seconds to 5 minutes, the shorter times being applicable by pinch rolls and the longer times being applicable by press tools.

Preheat may be applied to the polyethylene or to the metal substrate or to both the polyethylene and the metal substrate.

If desired the polyethylene may be pretreated by a pretreatment chosen from corona discharge, glow discharge or flame treatment; however this pretreatment is not essential. The metal substrate may be flame-treated before engagement with the polyethylene.

In a second embodiment of the method the polyethylene and metal substrate may be bonded to a relatively low strength at a temperature in the range 140° C. to 300° C., after which the structure is heated without applied pressure at a temperature in the range 180° C. to 300° C. to create a stronger bond. Preferably this period of heat without pressure does not exceed 5 minutes.

The structure produced by the method may be formed into articles by folding to a pouch or tray or alternatively drawing between a punch and die to make a hollow article. After such mechanical working operations it may be desirable to heat the article in order to ensure that the polyethylene is bonded to the substrate.

We have found that linear low density polyethylenes of the type defined above made by the low pressure process, will provide a means to achieve high bond strength between the polyethylene and metal substrate without recourse to adhesives, with less energy input than is required for conventional polyethylenes.

BRIEF DESCRIPTION OF THE DRAWINGS

Embodiments of the invention will now be further described by way of example and with reference to the accompanying drawings, in which.

DESCRIPTION OF THE PREFERRED EMBODIMENTS

Figure 1:
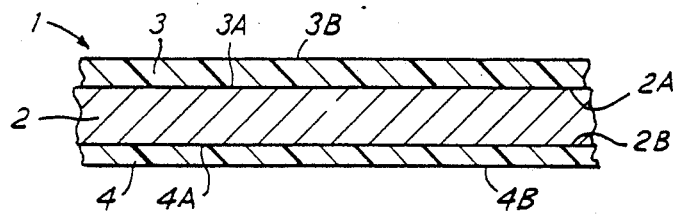
FIG. 1 is a sectioned side elevation of a laminated structure.

In FIG. 1 a structure 1 is shown to comprise a sheet metal substrate 2, a first outer layer 3 of polyethylene and a second outer layer 4 of polyethylene, the polyethylene being a linear low density polyethylene having a density from 0.91 to 0.94 g.ml$^{-1}$ and a melt flow index from 0.2 to 2.0 g/10 min, produced by low pressure copolymerisation of ethylene and but-1-ene. Both the first and second layers of polyethylene are firmly engaged with the metal substrate without recourse to any further adhesive.

The structure of FIG. 1 is formed by engaging a surface 3a of the first outer layer 3 with a surface 2a of the metal substrate 2 and a surface 4a of the second outer layer 4 with a surface 2b of the metal substrate 2, heating at least the metal substrate 2 and applying pressure to the free surfaces 3b and 4b to form the structure. Pressure may be applied by means of press platens as will be described with reference to FIG. 2 or by means of a pair of rolls as will be described with reference to FIG. 3. However in FIG. 3a structure having only one plastics layer is described to show that the invention is not limited to metal substrates having a plastics coating on both sides.

Figure 2:
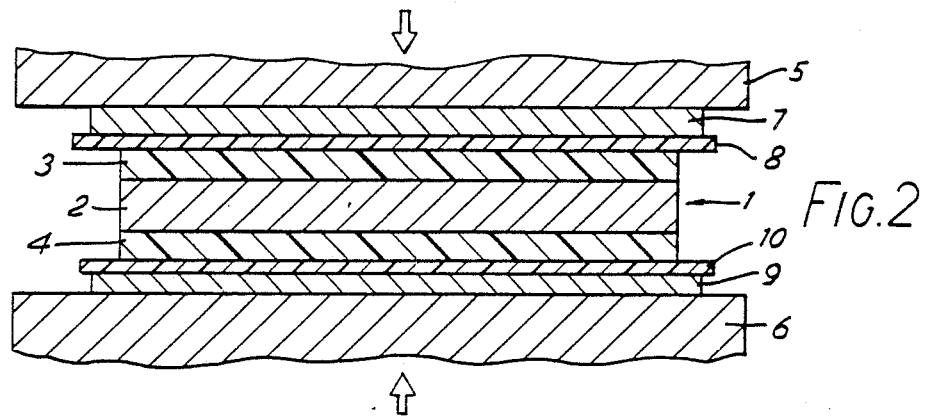
FIG. 2 is a sectioned side view of a press tool during pressing of the laminated structure.

FIG. 2 shows the structure 1 while being pressed in a simple press as may be used in a laboratory to produce samples about 12 cm wide by 20 cm long from which test pieces may be cut. The samples are also big enough to provide a blank for further forming into a hollow article by processes such as are used for folding, stamping, drawing or wall ironing. The press tools comprise an upper platen 5 and a lower platen 6 mounted in a press (not shown) so that the tools may be opened to permit entry of the sheet metal and polyethylene and closable to apply pressure to form the structure. The press platens 5 and 6 are heated and on closing the platens the pressure arising from platen 5 is delivered through an upper copper plate 7 and an upper sheet 8 of polytetrafluoroethylene (PTFE) into the layer 3 of polyethylene, and the pressure arising from the plate 6 is delivered through a lower copper plate 9 and a lower sheet 10 of PTFE on to the layer 4 of polyethylene.

The purpose of the copper plates 7 and 9 is to spread the heat from the platens 5, 6 evenly across the structure. The purpose of the PTFE sheets 8, 10 is to prevent the polyethylene sticking to the copper sheets 7, 9.

The use of the press tools will now be explained by an example: A blank 12 cm wide by 20 cm long was cut from a larger sheet of chromium/chromium oxide coated steel known in the trade as TFS. The blank was 0.21 mm thick, temper 2, type D steel. Two copper plates each 25 cm long×25 cm wide were wiped clean with a soft rag. A strip of PTFE film 13 cm wide by 22 cm long was placed on each copper plate to act as non-stick linings. A strip of linear low density polyethylene (LLDPE) film 100μ thick measuring 12 cm wide×20 cm long was placed on each non-stick lining (the LLDPE film used was one provided under the the number LPX2 by Esso Co.). The TFS blank was cleaned with alcohol and then sandwiched between the PTFE/LLDPE covered copper plates in the stacking order depicted in FIG. 2. The stack of steel, polyethylene and copper plates was then placed between the platens of the press which were at 200° C. The press platens were closed and a load of about 10 tonnes was maintained for 30 seconds. Thereafter the platens were opened and the structure was removed from the press to cool in air before testing. The purpose of the applied pressure is to effect bonding between the sheet metal and the polyethylene films and also to exclude bubbles between the films and the sheet metal.

Figure 3:
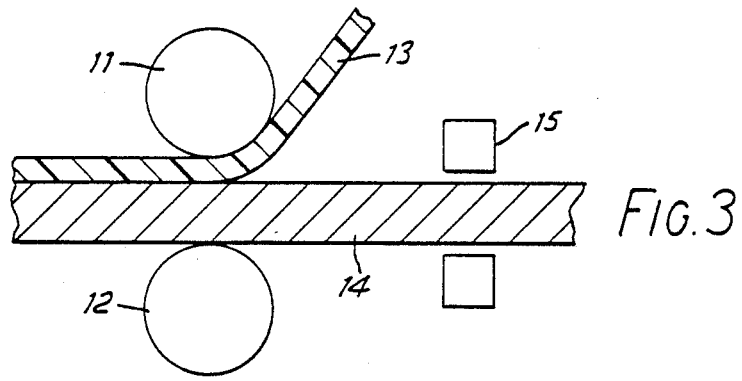
FIG. 3 is a diagrammatic sketch of a pair of rolls for pressing the laminated structure.

FIG. 3 shows a pair of rolls 11, 12 set apart a distance to compress a single polyethylene film 13 on to a preheated strip of sheet metal 14. Such an arrangement has the advantage that bubbles will be driven out as the polyethylene film engages the strip of sheet metal. As the rolls impose a pinch pressure along a line of contact parallel to the axis of the rolls it is difficult to give a quantitative estimate of the pressure imposed to produce the structure. Whilst the strip of sheet metal could be heated by a gas burner the source of heat shown is an induction heater denoted 15.

The polyethylene may if desired be pretreated by a pretreatment chosen from corona discharge, glow discharge or flame treatment as is commonly used in the art.

Various linear low density polyethylene films, having a density of 0.91 to 0.94 g.ml$^{-1}$ and a melt flow index from 0.2 to 2.0 g/10 min, and formed from ethylene and but-1-ene, and various types of sheet metal may be used and in Table 1 several examples are given together with the peel strengths of the structure measured on testing in a 90° peel strength test per 2.5 cm of width laminate: The results obtained with linear low density polyethylene film (LLDPE) may be compared with the results obtained with low density polyethylene (LDPE) and high density polyethylene (HDPE) shown in the first two groups of the Tables. All these samples were prepared without pre-treatment of the polyethylene.

TABLE 1

Comparison of bond strengths arising between various metal substrates and various polyethylenes.

| Polymer: | Type | Metal | 90° Peel Strength per 2.5 cm width | Bond strength arising from 30 seconds at 200° C. |
|---|---|---|---|---|
| ICI ALK 11/01 | LDPE | TFS | — | No bond to TFS |
| ICI ALK 11/01 | LDPE | TINPLATE | — | No bond to tinplate |
| ICI ALK 11/01 | LDPE | BLACKPLATE | — | No bond to blackplate |
| ICI ALK 11/01 | LDPE | ALUMINUM | — | No bond to aluminum |
| BP RIGIDEX 50 | HDPE | TFS | — | Weak Bond |
| BP RIGIDEX 50 | HDPE | TINPLATE | — | Weak Bond |
| BP RIGIDEX 50 | HDPE | BALCKPLATE | — | Weak Bond |
| BP RIGIDEX 50 | HDPE | ALUMINUM | — | Weak Bond |
| ESSO LPX2 | LLDPE | TFS | 2500 gm: | Strong Bond: 25N/2.5 cm |
| ESSO LPX2 | LLDPE | TINPLATE | 4800 gm: | Strong Bond: 47N/2.5 cm |
| ESSO LPX2 | LLDPE | BACKPLATE | 5600 gm: | Strong Bond: 55N/2.5 cm |
| ESSO LPX2 | LLDPE | ALUMINUM | 3330 gm: | Strong Bond: 32N2.5 cm |

TABLE 1-continued

Comparison of bond strengths arising between various metal substrates and various polyethylenes.

| Polymer: | Type | Metal | 90° Peel Strength per 2.5 cm width | Bond strength arising from 30 seconds at 200° C. |
|---|---|---|---|---|
| UNIFOS 8001 | LLDPE | ZINC COATED STEEL: HOT DIPPED | | Strong Bond 56N/2.5 cm (Bonded at 220° C. for 4 minutes) |

From the Table it can be seen that linear low density polyethylene bonds well to the chromium/chromium oxide coated steels (TFS), tinplate, blackplate and aluminium.

In order to make the results of Table 1 more comprehensive various films of high density, low density, and linear low density polyethylenes were bonded to a steel having a coating of chromium/chromium oxide (called TFS).

Each sample structure was made approximately 2.5 cm long by 2.5 cm wide (6.25 cm² in area) using a small press which permitted close control of the temperature and pressure imposed during lamination. The top tool had controlled heating means.

Five specific temperatures for bonding were chosen in the range 240° C. to 295° C. In each case the laminating pressure was 2500 kPa. Two laminating periods were chosen, namely 10 seconds and 5 seconds.

Each structure was prepared by placing a narrow strip of polyethylene terephthalate (PET) along one edge of a TFS test piece, laying the polyethylene film on the PET and TFS. The PET strip serves as an aid to the preliminary peeling necessary to provide portions grippable in the tensile testing machine. A layer of release film was placed over the polyethylene and the structure was placed on the small press for bonding with the metal uppermost against the hot tool.

Alternative test structures comprising TFS/polyethylene/TFS were also tested to observe the consistency of results.

The bond strength was measured by means of an Instron tensile testing machine in which the structure was pulled apart at a rate of 2 cm/min. It was observed that the 90° angle of peel varied as did the strength observed so the mean of three maximum values were recorded (see column 6 of Table 2). The results are recorded in Newtons per width of test structure (nominally 2.5 cm).

The peel strength observed also varied during peeling apart particularly when test pieces made in the larger press were tested. Values of strengths which were exceeded for 25% of the peeling period were noted, and are recorded as means of 3. (See the results in parenthesis in column 8 of Table 2).

The results are recorded in Table 2 in which the left hand column (1) indicates the subgroups of polymer tested, LLDPE denoting linear low density polyethylene; LDPE denotes low density polyethylene; and HDPE denotes high density polyethylene;

column (2) records the polymer tested by trade name or code;
column (3) records the melt flow index in gm/10 min;
column (4) records the density of polymer in gm/ml;
column (5) records the number of branches per 1000 backbone carbon atoms as estimated by nuclear magnetic resonance;
column (6) records the peel strengths arising from bonding of small samples at various temperatures for a period of 10 seconds;
column (7) records the peel strengths arising from bonding of small samples at 295° C. for 5 seconds; and
column (8) records the peel strengths arising from bonding in the larger press at 235° C. for 4 minutes, these results being based on a standard 2.5 cm wide test piece pulled at 2 cms/min. The numbers in brackets in column 8 indicate the bond strength exceeded for 25% of the peeling action.

It is not possible to compare fairly the results of columns 6 and 7 with 8 because of the differing type of test piece.

Column (5) records the number of side branches per 1000 backbone carbon atoms. As these side branches are not easily incorporated into the crystalline lattice, they lead to an increase in the amorphous content of the polymer and thence a lowering in density. The relationship between number of side branches (column (5)) and density (column (4)) is apparent.

We believe that polyethylenes having a significant number of ethyl side branches (more than the 4 side branches per 1000 carbon atoms of SCLAIR 16A) which is reflected in a density of less than 0.94 g.ml$^{-1}$, give rise to satisfactory bonding to metals.

Study of column 6 shows that the LLDPE polyethylenes having a significant number of ethyl sidechains (but-1-ene copolymers denoted Group A in column 1 with density between 0.91 and 0.94) give much higher bond strengths than the LLDPE polyethylenes having hexyl sidechains (Group B in column 1). For example "Unifos 8001" in Group A had a peel strength of 120N/2.5 cm when bonded to TFS at 260° C. for 10 seconds in contrast to "DOW61500/35" which had a peel strength of 26N/2.5 cm when bonded under the same conditions to TFS.

It must be pointed out that the results given for SCLAIR 16A are low because this grade of linear low density polyethylene has a high density and an insufficient number of ethyl side chains.

The low density polyethylenes of Group C and the high density polyethylenes of Groups D and E also gave much weaker bonds than the Group A linear low density polyethylenes with density between 0.91 and 0.94. Although the polyethylenes of Groups B, C, D and E did achieve increased bond strengths at high temperatures of 275° C. and 295° C. they never match the Group A polymers. It is therefore concluded that linear low density polyethylenes having ethyl sidechains and with density from 0.91 to 0.94 g.ml$^{-1}$ require less energy to achieve a strong bond than do the other polyethylenes tested. Column 7 confirms this conclusion at a lower period of pressing of 5 seconds.

Column 8 serves to show that the results are reproducible on large scale samples. Again the linear low density polyethylenes (of Group A) having ethyl side chains show the greatest bond strengths (see UNIFOS 8001). However it must be observed that while the HDPE R0O2/47 gave a peel strength of 215N/2.5 cm, heating the article to a temperature, preferably in the range 200° C. to 295° C., to re-establish the bond between the linear low density polyethylene and the metal substrate.

TABLE 2

| (1) Subgroup | (2) Polymer (Trade name) | (3) MFI (g/10 mins) | (4) Density (g·ml$^{-1}$) | (5) No. of branches per 1000 backbone carbon atoms | (6) Small Press 10 secs | | | | (7) 5 secs 295° C. | (8) Large Press 4 mins 235° C. |
|---|---|---|---|---|---|---|---|---|---|---|
| | | | | | 240° C. | 260° C. | 275° C. | 295° C. | | |
| A LLDPE ethyl sidechain (but-1-ene copolymer) | Unifos 8001 | 1.0 | 0.919 | 20 | 47 | 120 | 112 | 107 | 106 | 305 (275) |
| | Esso LPX1 | 1.0 | 0.918 | — | 20 | 106 | 107 | 114 | 125 | 174 (158) |
| | Esso LPX2 | 2.0 | 0.920 | 21 | 4 | 28 | 70 | 74 | 63 | 198 (160) |
| | Sclair 16A | 0.25 | 0.946 | 4 | 0 | 1 | 16 | 84 | 11 | 37 (23) |
| B LLDPE Hexyl sidechain | Dow 2045 | 1.0 | 0.920 | 19 | 0 | 16 | 29 | 26 | 14 | 66 (40) |
| | Dow 61500/35 | 6.0 | 0.919 | 24 | 4 | 26 | 30 | 27 | 12 | 5 (3) |
| | Dow 2553 | 40.0 | 0.935 | 10 | 0 | 6 | 2 | 3 | 2 | 3 (1) |
| C LDPE | ALK 36 | 0.2 | 0.936 | — | 12 | 33 | 52 | 55 | 37 | 149 (137) |
| | ALK 11/01 | 2.0 | 0.918 | 30 | 0 | 2 | 19 | 34 | 26 | 84 (74) |
| | SHELL 30 040 | 40.0 | 0.927 | — | 0 | 3 | 4 | 5 | 8 | 19 (10) |
| D HDPE copolymer | R002/47 | 0.2 | 0.947 | — | 0 | 10 | 42 | 72 | 39 | 215 (187) |
| | R002/55 | 0.2 | 0.953 | 1 | 0 | 28 | 41 | 106 | 26 | 171 (135) |
| | R40 | 4.0 | 0.949 | — | 0 | 4 | 13 | 19 | 17 | 102 (87) |
| E HDPE homopolymer | R00 6/60 | 0.6 | 0.960 | — | 0 | 12 | 27 | 85 | 23 | 177 (160) |
| | R50 | 5.0 | 0.962 | 3 | 1 | 15 | 21 | 29 | 22 | 85 (65) |
| | R180/60 | 18.0 | 0.965 | — | 0 | 10 | 24 | 31 | 22 | 54 (23) |

Values are maximum bond strength correct to the nearest integer in N/2.5 cm (nominal).
Values in parenthesis in column 8 are mean values in the same units of strengths exceeded for 25% of the peeling action.

this prolonged treatment is not commercially attractive.

The laminates of LLDPE with TFS were further tested by thermal processing in water in a pressure cooker at 100 kPa and at 120° C. for 1 hour; no delamination was observed. The laminates of LLDPE with TFS were also drawn into cup shaped articles and no delamination occurred.

Figure 4:
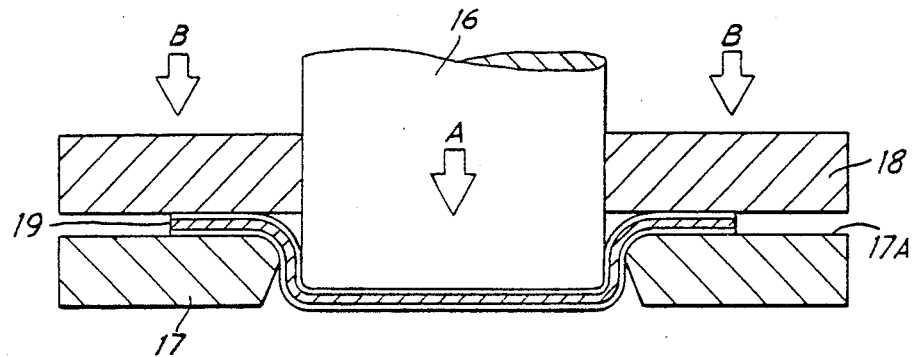
FIG. 4 is a diagrammatic side view of a punch and die for pressing the laminated structure.

FIG. 4 shows a tool set comprising a punch 16, and die 17 through which the punch 16 is moved as indicated by arrow "A", and a blank holder 18 which is moved as indicated by arrows B to co-operate with the top face 17A of the die 17 to restrain a blank from wrinkling as the punch 16 pushes the blank through the die 17 to draw a hollow body.

In FIG. 4 the tool set is depicted during the drawing of a circular blank 19 cut from the laminated article of FIGS. 1, 2 or 3 so that, as the punch 16 pushes the central portion of the blank through die 17, the blank holder 18 co-operates with the top face 17A of the die 17 to prevent wrinkling of the peripheral margin of the blank.

Figure 5:
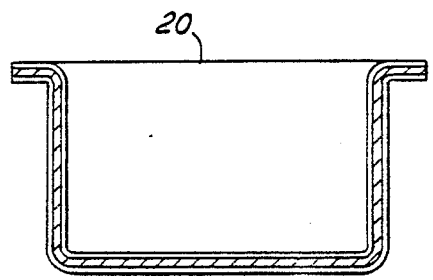
FIG. 5 shows in sectioned elevation a hollow article produced by the punch and die of FIG. 4.

FIG. 5 shows the hollow body 20 drawn by the tool set of FIG. 4. Although this body 20 has been drawn from a blank having linear low density polyethylene film on both sides, a blank having a film on one side only may be used if for example a drawn can having an internal film is desired.

The laminated article may also be shaped by a punch and die such as are used to make shallow articles such as trays and mats. When the metal substrate is a foil such as aluminium foil the laminated article may be used for making bags and the like. When rolls are used to pinch the linear low density polyethylene film into engagement with the sheet metal or foil, the sheet metal or foil and film may be fed from coils such as are supplied by the manufacturers of the metal and film. During the folding or drawing of the structure to form an article, the polyethylene to metal bond may be weakened. However this possible weakening may be repaired by It is known that increased levels of adhesion to metals can be obtained by pre-treating polymer films by corona discharge, glow discharge and flame treatments and such treatments are commonly used in the art. The following Table 3 records results obtained for samples of various polyethylenes pretreated by flame and subsequently laminated to TFS samples, in comparison with results obtained for untreated samples. It will be seen that the pre-treatment produced substantially improved adhesion with the LLDPE samples, so that the treated LLDPEs easily out-performed the treated HDPE.

The left hand column (1) indicates the subgroups of polymer tested, LLDPE denoting linear low density polyethylene and HDPE denoting high density polyethylene.

Column (2) records the polymer tested by trade name or code; column (3) indicates whether the polymer tested has been flame treated or not. Superscript (b) in Table 3a refers to a flame treatment which has given the polymer a surface energy of 42 dynes cm$^{-1}$. More powerful flame treatments give higher values of surface energy. Superscript (c) in Table 3b refers to a flame treatment which has given the polymer a surface energy of 46 dynes cm$^{-1}$. These polymers in Table 3b were thus more highly treated than those of Table 3a. Column (4) records the peel strengths arising from bonding of small samples at various temperatures for a period of 10 seconds.

Table 3a gives results for samples laminated at a contact pressure of 363 lb in$^{-2}$ and Table 3b refers to samples laminated at a contact pressure of 32 lb in$^{-2}$.

Study of column (4) shows that flame treatment of the non-LLDPE polyethylenes gives increased bond strength values compared to untreated controls. The former values are comparable with those achieved with untreated LLDPEs in accordance with the invention, must notably Unifos 8001. The adhesion benefits of the selected untreated LLDPE materials can thus be achieved with other polyethylenes, but only with the additional costs of pretreatment processes. Therein lies the major benefit of the selected LLDPEs.

Flame treatment of the selected LLDPEs causes increase in the bond strength values compared to the untreated controls. However as the bond strengths of the untreated LLDPEs were already high the flame treatment achieves superior bond strengths compared to other polyethylenes. Thus flame treatment of the selected LLDPEs gives higher bond strength measurements compared to those obtained with comparable flame treatments on non-LLDPE materials.

It is not possible to compare fairly the results of column 4 for Table 3a with Table 3b because of the differing level of flame treatment and contact pressures used.

TABLE 3

Bond Strength Measurements
Comparison of flame and untreated polymer samples laminated to TFS (a)

| (1) Subgroup | (2) Polymer (Trade name) | (3) Treatment | (4) Small Press 10 secs Pressure = 363 psi | | |
|---|---|---|---|---|---|
| | | | 240° C. | 260° C. | 275° C. |
| A LLDPE (but-1-ene co-polymer) | Esso LPX$_2$ " | Untreated Treated (b) | 4 44 | 28 56 | 70 78 |
| D HDPE co-polymer) | Rigidex 002/47 " | Untreated Treated (b) | 0 20 | 10 28 | 42 79 |
| E HPDE Homopolymer | Rigidex 50 | Untreated Treated (b) | 7 1 | 16 15 | 19 21 |

(b)

| Subgroup | Polymer | Treatment | Small Press 10 secs Pressure = 32 lb in$^{-2}$ | | |
|---|---|---|---|---|---|
| | | | 260° C. | 275° C. | 295° C. |
| A LLDPE (but-1-ene co-polymer) | Unifos 8001 " | Untreated Treated | 21 69 | 51 113 | 77 124 |
| LLDPE (but-1-ene co-polymer) | Esso LPX$_2$ " | Untreated Treated | 0 93 | 1 85 | 16 94 |
| E HDPE Homopolymer | Rigidex 50 " | Untreated Treated | 0 22 | 0 28 | 8 50 |

The relatively poor results obtained with LPX2 untreated when subjected to only 32 lb. in$^{-2}$ pressure may be attributed to the fact that its melt flow index of 2 g/10 min is on the upper limit of the selected range and so a higher pressure or pre-treatment is necessary to ensure good adhesion.

I claim:

1. A method of making a laminated structure including an element of polyethylene bonded to a surface of a metal substrate, comprising the steps of engaging the polyethylene element with the surface of the metal substrate and bonding it directly to the metal substrate by the application of heat and pressure, the polyethylene being selected to be a linear low density polyethylene having a density from 0.91 to 0.94 g/ml$^{-1}$ and a melt flow index in the range 0.2 to 2.0 g/10 min, produced by low pressure co-polymerisation of ethylene and but-1-ene.

2. A method according to claim 1 characterised in that the polyethylene element is in the form of a film, and said metal substrate is in the form of a sheet or foil, said film being engaged to a surface of the sheet or foil.

3. A method according to claim 1 characterised in that the polyethylene element and substrate are heated to a temperature within the range 200° to 300° C.

4. A method according to claim 1 characterised in that the pressure applied is less than 3500 kPa.

5. A method according to claim 4 characterised in the pressure applied is in the range of 200 to 2400 kPa.

6. A method according to claim 1 characterised in that the pressure is applied for a period in the range 0.1 seconds to 5 minutes.

7. A method according to claim 1 characterised in that the surface of the metal substrate is heated before the polyethylene element is engaged therewith.

8. A method according to claim 1 characterised in that the polyethylene element is heated before engagement with the surface of the metal substrate.

9. A method according to claim 1 characterised in that the polyethylene element is pretreated by a pretreatment chosen from corona discharge, glow discharge or flame treatment.

10. A method according to claim 1 characterised in that the metal surface is flame treated before the polyethylene element is engaged therewith.

11. A method according to claim 1, characterised in that, after initial engagement of the polyethylene and substrate at a temperature in the range 140° C. to 300° C. the laminated structure is heated without pressure at a temperature in the range 180° C. to 300° C.

12. A method according to claim 11 characterised in that the laminated structure is heated within the range 180° C. to 300° C. for a period not exceeding 5 minutes.

13. A method according to claim 2 characterised in that the polyethylene film is engaged with two opposed surfaces of the metal sheet or foil to form a laminated structure of polyethylene/metal/polyethylene.

14. A method according to claim 2 characterised in that the metal sheet or foil is engaged with both surfaces of the polyethylene film to form a laminated structure of metal/polyethylene/metal.

15. A method according to claim 2 characterised in that the metal substrate is a sheet or foil of a metal chosen from steel; steel coated with tin or chromium or chromium/chromium oxide or zinc; aluminium; aluminum alloy; nickel; zinc or copper.

16. A method according to claim 15 characterised in that the surface of the metal substrate has a conversion coating applied thereto before the polyethylene is engaged therewith.

17. A method according to claim 1, characterised in that the laminated structure is formed to an article by a process chosen from pressing, stamping, drawing, deep drawing or wall ironing.

18. A method according to claim 17, characterised in that the article is heated to a temperature in the range 200° C. to 300° after forming from the laminated structure.

19. A method of making a laminated structure including an element of polyethylene bonded to a surface of a metal substrate, comprising the steps of engaging the polyethylene element with the surface of the metal substrate and bonding it directly to the metal substrate by the application of heat and pressure, the polyethylene being selected to be a linear low density polyethylene having a density from 0.91 to 0.94 g/ml$^{-1}$ and a melt flow index in the range 0.2 to 2.0 g/10 min, produced by low pressure co-polymerisation of ethylene and but-1-ene, and the polyethylene element, prior to initial engagement with the surface of the metal substrate, having not been pretreated by a pretreatment chosen from Corona discharge, glow discharge or flame treatment.

20. A method of making a laminated structure including an element of polyethylene bonded to a surface of a metal substrate, consisting essentially of the steps of engaging the polyethylene element with the surface of the metal substrate and bonding it directly to the metal substrate by the application of heat and pressure, the polyethylene being selected to be a linear low density polyethylene having a density from 0.91 to 0.94 g/ml$^{-1}$ and a melt flow index in the range 0.2 to 2.0 g/10 min, produced by low pressure copolymerization of ethylene and but-1-ene.

21. A method according to claim 20 wherein a bond strength of at least 70N/2.5 cm is achieved.

22. A method according to claim 20 wherein the bonding is carried out at a temperature within the range 200° to 300° C., a pressure in the range of 200 to 2400 kPa, and for a period in the range 0.1 seconds to 5 minutes.

* * * * *